United States Patent [19]

Tominari et al.

[11] Patent Number: 5,525,701
[45] Date of Patent: Jun. 11, 1996

[54] METHOD FOR THE MANUFACTURE OF AROMATIC POLYCARBONATE

[75] Inventors: Kenichi Tominari, Narashino; Akio Kanezawa, Sodegaura; Takeshi Sakashita, Moka; Kimiyoshi Miura, Saeki-gun; Tomoaki Shimoda, Iwakuni, all of Japan

[73] Assignee: General Electric Company, Pittsfield, Mass.

[21] Appl. No.: 353,857

[22] Filed: Dec. 12, 1994

[30] Foreign Application Priority Data

Dec. 14, 1993 [JP] Japan .................................. 5-342116

[51] Int. Cl.⁶ .................................................. C08G 64/00
[52] U.S. Cl. ...................... 528/199; 210/323.1; 502/150; 502/152; 502/157; 502/200; 502/202; 526/64; 526/65; 526/67; 528/196; 528/198; 528/200; 528/201; 528/204; 528/219; 528/271; 528/272; 528/274; 528/275

[58] Field of Search ................... 526/64, 65, 67, 526/71; 528/196, 198, 199, 200, 201, 204, 219, 271, 272, 274, 275, 288; 210/323.1; 502/150, 152, 157, 200, 202

[56] References Cited

U.S. PATENT DOCUMENTS 4,500,706  2/1985  Mathis et al. .......................... 528/502
5,026,817  6/1991  Sakashita et al. ...................... 528/199

Primary Examiner—James J. Seidleck
Assistant Examiner—Terressa Mosley

[57] ABSTRACT

Aromatic polycarbonates manufactured by polycondensation of a dihydric compound and a carbonic acid diester using at least two reactors in series have improved color and low impurities content when filtered before the final reactor and again before the final reactor outlet.

3 Claims, 2 Drawing Sheets

METHOD FOR THE MANUFACTURE OF AROMATIC POLYCARBONATE

Aromatic polycarbonates have excellent mechanical characteristics such as impact resistance, etc., in addition to excellent heat resistance, transparency, etc.; thus, they have been used widely. Conventional methods for making aromatic polycarbonates include a method of direct reaction of a dihydric aromatic compound such as bisphenol A and phosgene (interfacial method) or an ester exchange reaction between a dihydric aromatic compound such as bisphenol A and a carbonic acid ester such as diphenyl carbonate (polycondensation method). Currently, the former method is used in general, while the latter seems to have a promising future, became this method does not use phosgene, which is very difficult to handle.

In general, bisphenol A (m.p. 156° C.) and diphenyl carbonate (m.p. 80° C.) are separately or together melted by heating, a catalyst is added to the mixture of the two compounds, and the resulting mixture is heated in a reactor to the reaction temperature for the polycondensation.

Usually, when polycarbonates are used for optical applications or precision parts, filtration is carried out for removal of dust, impurities, or gel from the polymer.

The polycarbonates prepared by the interfacial method using phosgene are usually obtained as powders. They are remelted using an extruder and passed through a filter to remove impurities.

On the other hand, the polycarbonates obtained by the polycondensation of a $I_0$ dihydric aromatic compound and a carbonic acid ester are obtained as a melt after completion of the polycondensation, and the melt can be filtered directly, which is an advantage.

However, in a continuous process for polycarbonates using the polycondensation reaction, filter clogging often occurs, requiring replacement of filters; thus, sustained stable operation is difficult.

It is an object of the present invention to manufacture, in sustained stable manner, aromatic polycarbonates having excellent color and low impurity content.

The present invention concerns a method characterized in that in manufacturing an aromatic polycarbonate by melt polycondensation of a dihydric aromatic compound and a carbonic acid diester using at least two reactors in series, at least one filter is installed before the final reactor and at the final reactor outlet.

We have discovered that the colored matter formed during the polycondensation step in the reactor has a relatively large diameter and the discoloration-causing materials, of relatively small particle diameter, are foreign matters such as dust, impurities, etc., included in the raw materials such as the dihydric aromatic compounds, carbonic acid esters, etc. In the present invention, these microparticles are removed by high-precision filtration before the final reactor, in which the polymer viscosity is relatively low, and the colored matters formed in the reactor are removed by crude filtration in the final stage, at which the polymer viscosity is high.

In the present invention, since high precision filtration is carried out before the final reactor while the viscosity is relatively low, crude filtration at the final stage at high viscosity is easy; thus, polycarbonates with good color and a very small impurity content can be prepared reactorpared in stable manner over a long period of time.

When filtering all the impurities only at the final reactor outlet, the filter at the final reactor outlet becomes clogged in a short period of time, resulting in frequent replacement of the filter. During the filter replacement, the polymer has to be taken out before the filter or operation has to be stopped, thus a long-term, stable operation cannot be assured. It may be possible to use two or more filters in parallel with one at a time being active. However, in branching the pipeline for a multiple line, in ordinary design, polymer dwelling cannot be avoided, which leads to polymer discoloration or deterioration.

The filter that can be used in the present invention is an ordinary type, such as a flat filter, cylindrical filter, candle type, etc. The filter installed before the final reactor should have an absolute filtration accuracy above 0.5 µm but below 5 µm. With an absolute filtration accuracy above 5 µm complete removal cannot be expected of the impurities included in the dihydric aromatic compounds and carbonic acid diesters and microparticles from catalysts and stabilizers; thus, the aromatic polycarbonate would have a high impurity content, which is not favorable. At least one such filter is installed before the final reaction.

When the filter before the final reactor is clogged and must be replaced, the raw material feeding is stopped. Operation after this filter can be continued with polymers from the raw materials already freed from the impurities. Thus, there would be no problems in operation during filter replacement. Before the final reactor, the polymer viscosity is low and dwelling is not likely, thus it is possible to install two or more filters in parallel and use them alternately.

The absolute filtration accuracy of the final reactor outlet is, preferably above 5 µm but below 30 µm. With the absolute filtration accuracy above 30 µm removal is not possible for polymer degradation products, causing discoloration. With the absolute filtration prepolymerization reactorcision below 5 µm filter clogging may occur, making long-term stable process of polycarbonate manufacture impossible. At least one such filter is installed at the final reactor outlet.

As described above, at least two filters are installed at an interval of one or more reactors in series. Such arrangement is appropriately made, depending on the type and number of reactors, polymerization conditions, etc., without any particular restrictions. For example, a filter with the most restrictive absolute filtration accuracy is installed at the first o reactor inlet, and a filter at each reactor outlet, in such a way that absolute filtration accuracy is less restrictive with increasing polymer viscosity.

The polymerization reaction of the present invention is carried out in the presence of catalysts. Preferred catalyts are described in Japanese Kokai Patent Application Nos. Hei 2 [1990]-124934 and Sho 60[1985]-51719. With such catalysts, gel microparticles of diameter less than 10 µm causing polymer degradation in the polycondensation stage, are not formed. Thus, merely with crude filtration at the final stage of high viscosity, for removal of carbonized polymer of particle diameter above 10 µm formed near the gas-liquid interface in the reactor, the objectives of the present invention are completely achieved.

Such catalysts include (a) nitrogen-containing basic compounds and (b) alkali metal compounds or alkaline earth metal compounds.

The nitrogen-containing basic compounds (a) may be alkyl, aryl, or araryl group-containing ammonium hydroxides such as tetramethylammonium hydroxide ($Me_4NOH$; Me stands for methyl group; hereafter, Et for ethyl group, Bu for butyl group, Ph for phenyl group), tetraethylammonium hydroxide ($Et_4NOH$), tetrabutylammonium hydroxide ($Bu_4NOH$), trimethylbenzylammonium hydroxide ($C_6H_5CH_2(Me)_3NOH$), etc.; tertiary amines such as trimethylamine, triethylamine, dimethylbenzylamine, triphenylamine, etc.; secondary amines represented by $R_2NH$ (R represents an alkyl group such as methyl, ethyl, etc., aryl group such as phenyl, tolyl, etc.), primary amines $RNH_2$ (R as defined above), ammonia, basic salts such as tetramethylammonium borohydride ($Me_4NBH_4$), tetrabutylammonium borohydride ($Bu_4NBH_4$), tetrabutylammonium tetraphenylborate ($Bu_4NBPh_4$), tetramethylammonium tetraphenylborate ($Me_4NBPh_4$), etc.

Among them, especially preferred are tetraalkylammonium hydroxides.

The alkali metal compounds (b) are, e.g., sodium hydroxide, potassium hydroxide, lithium hydroxide, sodium hydrogen carbonate, potassium hydrogen carbonate, lithium hydrogen carbonate, sodium carbonate, potassium carbonate, lithium carbonate, sodium acetate, potassium acetate, lithium acetate, sodium stearate, potassium stearate, lithium stearate, sodium borohydride, lithium borohydride, sodium phenylborate, sodium benzoate, potassium benzoate, lithium benzoate, disodium hydrogen phosphate, dipotassium hydrogen phosphate, dilithium hydrogen phosphate, bisphenol A disodium salt, dipotassium salt, and dilithium salt, phenol sodium salt, potassium salt, lithium salt, etc.

The alkaline earth metal compounds (b) are, e.g., calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate, etc.

Based on 1 mol of the dihydric aromatic compounds, the amount of the nitrogen containing basic compounds (a) used is $10^{-6}$–$10^{-1}$ mol, preferably $10^{-5}$$10^{-2}$ mol and alkali metal compounds or alkaline earth metal compounds (b) $10^{-8}$–$10^{-3}$ mol, preferably $10^{-7}$–$10^{-4}$ mol, more preferably $10^{-7}$–$10^{-5}$ mol.

When the amount of the nitrogen-containing basic compounds (a) is $10^{-6}$–$10^{-1}$ per 1 mol of the dihydric aromatic compounds, the ester exchange reaction and polymerization reaction proceed sufficiently to obtain polycarbonates with excellent color, heat resistance and water resistance.

When the amount of the alkali metal compounds and alkaline earth metal compounds (b) is $10^{-8}$–$10^{-3}$ mol per on 1 mol of the dihydric aromatic compounds, the polymerization activity is high, giving polycarbonates with excellent color, heat resistance and water resistance.

The catalysts comprising such (a) nitrogen-containing basic compounds and (b) alkali metal compounds or alkaline earth metal compounds have high polymerization activities, forming polycarbonates of high molecular weight, and such polycarbonates are excellent in heat resistance and water resistance and excellent transparency with improved color.

Other catalyts are comprised of (a) nitrogen-containing basic compounds, (b) alkali metal compounds or alkaline earth metal compounds, and (c) boric acid or boric acid esters.

Here, the nitrogen-containing basic compounds (a) and alkali metal compounds or alkaline earth metal compounds (b) are as shown above.

The boric acid or boric acid esters are boric acid or boric acid esters represented by the general formula $B(OR)_n(OH)_{3-n}$ (R is an alkyl group such as methyl, ethyl, etc., aryl group such as phenyl, etc.; n is 1, 2 or 3).

The boric acid esters are, e.g., trimethyl borate, triethyl borate, tributyl borate, trihexyl borate, triheptyl borate, triphenyl borate, tritolyl borate, tributyl borate, etc.

Based on 1 mol of the dihydric aromatic compounds, the amount of the nitrogencontaining basic compounds (a) used is $10^{-6}$–$10^{-1}$ mol, preferably $10^{-5}$–$10^{-2}$, alkali metal compounds or alkaline earth metal compounds (b) $10^{-8}$–$10^{-3}$ mol, preferably $10^{-7}$–$10^{-1}$, mol, more preferably $10^{-7}$–$10^{-5}$ mol, and boric acid or boric acid esters (c) $10^{-8}$–$10^{-1}$, preferably $10^{-7}$–$10^{-2}$ mol, more preferably $10^{-6}$–$10^{-4}$ mol.

When the amount of the nitrogen-containing basic compounds (a) used is $10^6$ $10^{-1}$ mol, per 1 mol of the dihydric aromatic compounds, the ester exchange reaction and polymerization reaction proceed sufficiently to obtain polycarbonates with excellent color, heat resistance, and water resistance.

When the amount of the alkali metal compounds or alkaline earth metal compounds (b) used is $10^{-8}$–$10^{-3}$ mol, per 1 mol of the dihydric aromatic compounds, the polymerization rate is high, forming polycarbonates with excellent color, heat resistance, and water resistance.

When the amount of the boric acid or boric acid esters (c) used is $10^{-8}$–$10^{-1}$, per 1 mol of the dihydric aromatic compounds, molecular weight lowering due to thermal aging does not occur, yielding polycarbonates With excellent color, heat resistance, and water resistance.

The catalyts comprising such (a) nitrogen-containing basic compounds, (b) alkali metal compounds or alkaline earth metal compounds, and (c) boric acid or boric acid esters have high polymerization activities, forming polycarbonates of high molecular weight; such polycarbonates are excellent in heat resistance and water resistance and exhibit excellent transparency with improved color.

Other catalysts comprise (a) at least one quaternary ammonium hydroxide represented by $(R^1)_4NOH$ ($R^1$ independently represents an alkyl group of 1–4 carbon atoms or an aryl or aralkyl group of 6–10 carbon atoms) and (b) at least one boric acid ester represented by the formula $(R^2O)_3B$ (in the formula, $R^2$ independently represents a lower alkyl group or a group represented by $X_nAr^1$; $Ar^1$ represents an aromatic hydrocarbon group of 6–10 carbon atoms; X independently represents an electron-withdrawing substituent; n represents from 0 to the number of possible substituents on the aromatic carbon atoms).

In the formula $(R^1)_4NOH$ (a), each $R^1$ represents an alkyl group of 1–4 carbon atoms (e.g., methyl, ethyl, n-propyl, isopropyl, n-butyl) or an aryl or arylalkyl group of 6–10 carbon atoms (e.g., phenyl, benzyl). Mostly, all $R^1$ are identical, with alkyl being methyl or ethyl, while methyl is prepolymerization reactorferred. Tetramethylammonium hydroxide is especially prepolymerization reactofferred. The formula $(R^2O)_3B$(b) represents alkyl, aryl or mixed alkylaryl boric acid esters. In the formula, $R^2$ represents a lower alkyl group, namely, an alkyl group of up to 7 carbon atoms, preferably 1–4 carbon atoms. The alkyl groups may be methyl, ethyl, butyl, hexyl, and heptyl groups, including all isomers, while normal compounds are preferred.

Any or all of $R^2$ may represent aromatic hydrocarbon groups (same as the above $Ar^1$) such as phenyl, tolyl, xylyl, naphthyl, etc. The above $Ar^1$ may contain 1 or more of electron-withdrawing X substituents such as nitro, halo (especially chloro), alkanoyl (e.g., acetyl), carboalkoxy (e.g., carbomethoxy), trifluoromethyl, etc. The number of substituents is shown by the subscript n and the highest number corresponds to the number of aromatic carbon atoms capable of substitution in $Ar^1$ (e.g., 5 for phenyl, 7 for naphthyl). Usually, n is 0, 1 or 2; when n is 1 or 2, the substituent is located at the ortho or para position relative to the boron atom. The n value is preferably 0 or 1, most preferably 0.

Preferred boric acid esters $(R^2O)_3B$ are tri-n-butyl borate and triphenyl borate.

The reactors that can be used in the present invention may be the conventional continuous, semicontinuous, or batch type, while a continuous type is preferred. In general, reactors of different stirring types are used at the prepolymerization stage with low viscosity, and postpolymerization stage, with high viscosity.

Such reactors may be vertical stirred-tank polymerization reactors, thin-film evaporative polymerization reactors, vacuum polymerization reactors, horizontal, stirred reactors, twin-screw vented extruders, etc. Two or more of them may be connected in series, preferably at least one of the two or more reactors is a horizontal reactor such as horizontal, stirred-tank polymerization reactor. Such combinations are, e.g., vertical, stirred-tank polymerization reactor-horizontal, stirred-tank polymerization reactor, horizontal, stirred-tank polymerization reactor-vertical, stirred-tank polymerizatien reactor, horizontal stirred-tank polymerization reactor-horizontal, stirred-tank polymerization reactor, vertical, stirred-tank polymerization reactor-vacuum polymerization reactor-horizontal, stirred-tank polymerization reactor, thin-film evaporative polymerization reactor-horizontal, stirred-tank polymerization reactors, etc. Preferably, three or more reactors are connected in series, with at least one reactor being a horizontal reactor such as a horizontal, stirred-tank polymerization reactor, e.g., two or more vertical, stirred-tank polymerization reactors-one horizontal, stirred reactor, one or more of vertical stirred-tank polymerization reactor-one shin-film evaporative polymerization reactor-one horizontal, stirred-tank polymerization reactor, one or more vertical stirred horizontal reactors-two or more of horizontal, stirred-tank polymerization reactors. With such combinations of two or more reactors in series, the polymerization reaction can be carried out efficiently.

In the present invention, the dihydric aromatic compounds can be represented by general formula

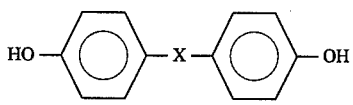

In the formula, X is

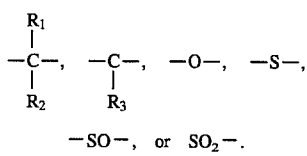

$-SO-$, or $SO_2-$.

$R_1$ and $R_2$ represent a hydrogen atom or monovalent hydrocarbon group; $R_3$ represents a divalent hydrocarbon group. The aromatic nucleus may have monovalent hydrocarbon groups.

Such dihydric aromatic compounds are, e.g., bis(hydroxyaryl)alkanes such as bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-1-methylphenyl)propane, 1,1-bis(4-hydroxy-3-t-butylphenyl)propane, 2,2-bis(4-hydroxy-3-bromophenyl)propane, etc.; bis(hydroxyphenyl)cycloalkanes such as 1,1-bis(4-hydroxyphenyl)cycloheptane, 1,1-bis(4-hydroxyphenyl)cyclohexane, etc.; dihydroxyaryl ethers such as 4,4'-dihydroxydiphenyl ether, 4,4'-dihydroxy-3,3'-dimethylphenyl ether, etc.; dihydroxydiaryl sulfides such as 4,4'-dihydroxydiphenyl sulfide, 4,4'-dihydroxy-3,3'-dimethyldiphenyl sulfide, etc.; dihydroxydiaryl sulfoxides such as 4,4'-dihydroxydiphenyl sulfoxide, 4,4'-dihydroxy-3,3'-dimethylphenyl [sic]sulfoxide, etc.; dihydroxydiphenyl sulfones such as 4,4'-dihydroxydiphenyl sulfone, 4,4'-dihydroxy-3,3'-dimethyldiphenylsulfone, etc., while 2,2-bis(4-hydroxyphenyl)propane (so-called bisphenol A) is especially preferred.

The carbonic acid diesters are, e.g., diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate, dicyclohexyl carbonate, etc., while diphenyl dicarbonate is especially preferred.

The carbonic acid diesten described above may contain below 50 mol %, preferably below 30 mol % of dicarbonic acids or dicarbonic acid esters. The dicarbonic acids and dicarbonic acid esters are, e.g., terephthalic acid, isophthalic acid, diphenyl terephthalate, diphenyl isophthalate, etc. When the dicarbonic acids or dicarbonic acid esters are used together with the carbonic acid diesten, polyesterpolycarbonates are obtained.

The amount of the carbonic acid diesters used based on 1 mol of the a dihydric aromatic compounds is 0.90–1.30 mol, preferably 0.95–1.20 mol. Compounds having three or more functional groups in 1 molecule (preferably phenolic hydroxy group or carboxy group) may be added, preferably in an amount Of 0.001–0.03 mol, especially 0.001–0.01 mol, per 1 mol of the dihydric aromatic compounds. Examples of such compounds are described in Japanese Kokai Patent Application No. Hei 4[1992]-89824.

In the polymerization various phenols may be used as end group blocking agents, e.g., those listed in Japanese Kokai Patent Application No. Hei 2[1990]-175723.

In the present invention, other additives can be added, such as the usual heat stabilizers, UV absorbers, releases, colorants, antistatic agents, slip agents, antiblocking agents, lubricants, antifogging agents, natural oils, synthetic oils, waxes, organic fillers, inorganic fillers, etc.

FIG. 1 shows an example of apparatuses that can be used for practicing the method of the present invention. The stirring bath (4) has a vertical rotating axle with stirring blades; to the bath the above-mentioned dihydric aromatic compounds and carbonic acid diesters are continuously fed via the pipelines (1) and (2). The atmosphere above the stirring bath is essentially free from oxygen. For example, the stirring bath is purged with nitrogen gas. Catalysts are added to the stirring bath via the pipeline (3). The raw materials are mixed together. A number of stirring baths may be connected in series for obtaining uniform solutions.

The mixed raw materials are pumped by the pump (5) through the pipeline (6) to the filter (15) with absolute filtration accuracy 0.5 μm but below 5 μm then to the prepolymerization reactor (8). The prepolymerization reactor is a vertical stirred-tank polymerization reactor having a vertical rotating axle with stirring blades. The reactor inner pressure is reduced through the vent pipe (7) at the upper portion. The phenol by-product and some unreacted monomers sucked through the pipe (7) are distilled; phenol is discharged from the system and the unreaeted toohomers are returned to the polymerization reactor. Further catalysts are fed through the pipeline (3').

The polymerization product in the prepolymerization reactor (8) is pumped by the gear pump (9) through the pipeline (10) to the filter (16) with absolute filtration accuracy above 0.5 μm but below 5 μm The combination of the prepolymefization reactor (8) and the filter (16) may be repeated in series, preferably 2–4 sets, with the reaction conditions becoming more strict toward downstream. The first prepolymerization reactor has a reaction temperature usually of 50°–270° C., preferably 150°–260° C., pressure from ambient to 6 mm Hg, with the lower limit preferably being 400–6 mm Hg, more preferably 300–6 mm Hg.

From the second prepolymerization reactor on, the reaction temperature is usually 180°–285° C., preferably 200°–270° C. and pressure 1–50 mm Hg, preferably 1–30 mm Hg.

The aromatic polycarbonates reaching a certain degree of polymerization have a limiting viscosity (h) of 0.1–0.5 dL/g, preferably 0.15–0.45 dL/g, more preferably 0.15–0.4 dL/g as measured in methylene chloride solution at 20° C.

The polymerization product is then fed to the horizontal stirred-tank polymerization reactor (12). This horizontal polymerization reactor has one or two or more horizontal rotating shafts having one or two or more stirring blades in shapes of a disk, wheel, paddle, rod, window frame, etc., in at least two steps in each shaft, in such a way that the reaction mixture is pushed up by the stirring blades to renew the reaction solution surface. This apparatus is capable of handling highly viscous solutions. The reaction temperature is usually 240°–320° C., preferably 250°–290° C., and pressure below 4 mm Hg, preferably 2 mm Hg.

The polymerization product in the horizontal, stirred-tank polymerization reactor (12) is pumped by the gear pump (13) through the pipeline (14) to the filter (17) with absolute filtration accuracy above 5 μm but below 30 μm The combination of the horizontal, stirred-tank polymerization reactor (12) and the filter (17) is at least one, preferably one or two, in series. In the case of two in series, only the filter installed at the final horizontal stirred-tank polymerization reactor outlet has an absolute filtration accuracy above 5 μm but below 30 μm. A viscous polymer is discharged from the bottom of the final, horizontal stirred-tank polymerization reactor by a geer pump through a filter to give a polycarbonate with, e.g., limiting viscosity [h] of 0.20–1.0 dL/g, preferably 0.30–0.9 dL/g, more preferably 0.33–0.8 dL/g as measured in a methylene chloride solution at 20° C. After the polycondensation reaction in the final, horizontal stirred-tank polymerization reactor, the reaction may be carried out further in a vented twin-screw extruder. When such a vented twin-screw extruder is used, since the polycondensation reaction is already in progress in the horizontal, stirred-tank polymerization reactor ahead, the reaction conditions in the vented twin-screw extruder can be relaxed. Thus, quality deterioration of the polycarbonate can be prevented. In this case, the vented twin-screw extruder is installed preferably between the gear pump (13) and the filter (17). Upon completion of the polycondensation, the molten polymer may be led into an extruder and kneaded with stabilizers and fillers. The extruder may be of conventional type, single-or twin-screw type, with or without vent. Also in this case, the extruder should be placed between the gear pump (13) and filter (17).

In FIG. 2, an example of the apparatus, comprising two vertical, stirred-tank polymerization reactors, one centrifugal, shin-film evaporative polymerization reactor, and one horizontal, stirred-tank polymerization reactor, is illustrated. To the stirred reactor (31 ), under nitrogen purging, are fed an aromatic polycarbonate and a carbonic acid diester via the pipes (32) and (33), respectively, and this is stirred well. A number of stirred reactors may be used in series to obtain a uniform solution.

The mixed raw material is pumped by the pump (53) via the pipeline (34) to the filter (47) of absolute filtration accuracy above 0.5 μm but below 5 μm then to the prepolymerization reactor (35). The prepolymerization reactor is a vertical, stirred-tank polymerization reactor with a vertical rotating shaft fitted with stirring blades.

In the above-mentioned prepolymerization reactor (35) a catalyst is continuously fed via the pipeline (36). The prepolymerization reactor (35) is controlled at a temperature and pressure suitable for initiation of the ester exchange reaction, e.g., 50°–270° C., preferably 150°–260° C., and from ambient pressure to 6 mm Hg. The reaction mixture from the prepolymerization reactor (35) is pumped by the pump (54) via the pipeline (37) to the filter (48) of absolute filtration accuracy above 0.5 μm but below 5 μm then to the prepolymerization reactor (38). If needed, catalysts may be added via the pipeline (36') to the pipeline (37).

The prepolymerization reactor(38) is controlled at a temperature and pressure suitable for the polycondensation reaction, e.g., 50°–270° C., preferably 150°–260° C. and ambient pressure to 6 mm Hg. The polycarbonate obtained in the prepolymerization reactor (38) has a limiting viscosity (h) of 0.01–0.4 dL/g as measured in a methylene chloride solution at 20° C.

The polymerization mixture in the prepolymerization reactor (38) is pumped by the pump (55) via the pipeline (40) to the filter (49) with absolute filtration accuracy above 0.5 μm but below 5 μm then to the centrifugal thin-film evaporative polymerization reactor (41). Here, with promotion of the evaporation of the phenol byproduct, polycondensation proceeds further to reach a limiting viscosity 0.1–0.5 dL/g. The centrifugal thin-film evaporative polymerization reactor (41) is operated at 180°–300° C. and 1–50 mm Hg.

The polymer is pumped by the pump (56) at the bottom of the centrifugal thin-film evaporative polymerization reactor (41) via the pipeline (43) to the filter (50) with absolute filtration accuracy above 0.5 μm but below 5 μm then to the horizontal, stirred tank polymerization reactor (44) for final polycondensation. Here, the polymer is substantially viscous, thus for sufficient stirring with promotion of the evaporation of the by-product monomers, the surface is renewed by the stirring blades on the horizontal rotating shaft. The horizontal stirred-tank polymerization reactor (44) is operated at 240°–320° C. and below 10 mm Hg.

The polymerization product in the horizontal, stirred-tank polymerization reactor (44) is pumped by the pump (57) via the pipeline (46) to the filter (51) with absolute filtration accuracy above 5 μm but below 30 μm then a viscous polymer is discharged from the product outlet (52) to obtain a polycarbonate with limiting viscosity (h) 0.20–1.0 dL/g, preferably 0.30–0.9 dL/g, more preferably 0.33–0.8 dL/g as measured in a methylene chloride solution at 20° C.

The phenol by-product in the polymerization reactor (38) is vaporized in the polymerization reactor under vacuum and led, together with a portion of unreacted monomer, to a distillation tower (not shown) via the pipe (39) and distilled. Phenol is discharged from the system and the unreacted monomer is returned to the polymerization reactor. The polymerization reactor (38) is connected to a vacuum pump (not shown) via the pipeline (39).

The phenol by-product is also drawn from the centrifugal thin-film polymerization reactor (41) and the horizontal, stirred-tank polymerization reactor (44) via the pipelines (42) and (45), respectively. The phenol by-product formation in the centrifugal thin-film polymerization reactor (41) and the horizontal, stirred-tank polymerization reactor (44) is small, thus the pipelines (42) and (45) are not connected to the above distillation tower, and phenol is simply condensed using a condenser.

The above reaction apparatuses and reaction conditions are for example only and do not limit the present invention.

The polycarbonates obtained by the methods of the present invention are suitable for general molding materials, especially for optical lenses such as automobile headlight lenses, glasses, etc., optical recording materials, etc.

Next, the present invention is explained in detail using examples, while the present invention is not limited to such examples.

EXAMPLES

In application and comparative examples, the viscosity of polymerization products was measured in a methylene chloride solution at 20° C. using a Ubbelohde viscometer.

The color (YI value) of the polycarbonate formed was measured by the method described below. A 3-mm-thick plate was injection molded at a cylinder temperature of 290° C., injection pressure 1000 kg/cm, 1 cycle time of 45 sec, die temperature 100° C. and measured for X, Y, Z values by a transmission method using a Color and Color Difference Meter ND-1001 DP of Nippon Denshoku Kogyo Co., Ltd. to obtain a measurement of yellowhess (YI): YI=100(1.277X−1.060Z)/Y.

The number of microparticles in the polycarbonates formed was measured by the method below. The resin was captured in a cleaning chamber, in which air was blown via a 0.1 μm filter, and measurement of 50 ml of 10% resin solutions in methylene chloride was made using an in=liquid microparticle counter KL-01 of RION Co. and KS-60 and KS-62 sensors.

Application Example 1

The polymerization apparatus used is shown in FIG. 1, comprising 2 prepolymerization reactor and 2 horizontal stirred-tank polymerization reactors. Filters with the absolute filtration accuracy shown below are installed, one each at a stirring tank, each prepolymerization reactor, and each horizontal stirred-tank polymerization reactor outlet.

|  | absolute filtration accuracy |
| --- | --- |
| Stirring tank outlet | 1 μm |
| Prepolymerization reactorpolymerizer A outlet | 5 μm |
| Prepolymerization reactorpolymerizer B outlet | 5 μm |
| Horizontal, stirred polymerizer A outlet | 5 μm |
| Horizontal, stirred polymerizer B outlet | 10 μm |

Reaction conditions are given below.

|  | Pressure (mm Hg) | Temperature (°C.) | Average dwelling time (h) |
| --- | --- | --- | --- |
| Stirring tank | Nitrogen atmosphere | 130 | 2.0 |
| Prepolymerizer A | 100 | 210 | 1.0 |
| Prepolymerizer B | 20 | 240 | 0.5 |
| Horizontal stirred polymerizer A | 3 | 275 | 0.5 |
| Horizontal stirred polymerizer B | 0.30 | 285 | 0.5 |

0.44 mol Bisphenol A (product of Nippon GE Plastics Co.), 0.46 mol diphenyl carbonate (NE Co.), 0.11 mol tetramethylammonium hydroxide catalyst ($2.5 \times 10^{-4}$ mol/mol bisphenol A) and 0.00044 mol sodium hydroxide catalyst ($1 \times 10^{-6}$ mol/mol bisphenol A) were continuously fed to the stirring tank maintained at the temperature given above, to obtain a uniform solution.

The solution was passed through the filter with absolute filtration accuracy given above, installed at the stirring tank outlet, the prepolymerization reactor A and the prepolymerization reactor A outlet filter, then the prepolymerization reactor B and prepolymerization reactor B outlet filter to obtain a polymerization product with a limiting viscosity (h) of 0.18. The polymerization product was fed to the horizontal, stirred-tank polymerization reactor A and horizontal, stirred-tank polymerization reactor A outlet filter, then horizontal, stirred-tank polymerization reactor B at 285° C. and 0.30 mm Hg pressure for completion of the polymerization. It was then freed from impurities by passing through the final horizontal, stirred-tank polymerization reactor B outlet filter. Operation under such conditions was continued for 2 months. The aromatic polycarbonate from the horizontal, stirred-tank polymerization reactor B outlet had limiting viscosity (h) of 0.36±0.01.

Particles above 10 μm were not detected in the aromatic polycarbonate formed, and its color was YI=0.9±0.1.

The increase in the pressure difference at the horizontal stirred-tank polymerization reactor B outlet was very small over a period of 2 months of operation. During this time, high-quality polycarbonates could be obtained in a stable manner without filter replacement.

Application Example 2

Except that filters were installed at the prepolymerization reactor reactor A outlet, the prepolymerization reactor reactor B outlet, and the horizontal stirred-tank polymerization reactor A outlet, Application Example 1 was repeated to obtain an aromatic polycarbonate. The aromatic polycarbonate formed at the horizontal stirred tank polymerization reactor B outlet had a limiting viscosity (h) of 0.36±0.01.

Particles above 10 μm were not detected in the aromatic polycarbonate formed, and its color was YI=0.9±0.1.

The increase of pressure difference of the filter at the horizontal, stirred-tank polymerization reactor B outlet is very small after 2 months of operation, as in Application Example 1, during which high-quality polycarbonates were obtained without filter replacement.

Application Example 3

The polymerization reactor used is shown in FIG. 1, comprising 2 prepolymerization reactor and one horizontal stirred-tank polymerization reactor. Filters of the absolute filtration accuracy shown below are installed, one each at the stirring tank, each polymerization reactor, and each horizontal, stirred-tank polymerization reactor outlet.

|  | absolute filtration accuracy |
| --- | --- |
| Stiffing bath outlet | 1 μm |
| Prepolymerization reactorpolymerizer A outlet | 5 μm |
| Prepolymerization reactorpolymerizer B outlet | 5 μm |
| Horizontal stirred polymerizer B outlet | 10 μm |

Reaction conditions are given below.

|  | Pressure (mm Hg) | Temperature (°C.) | Average dwelling time (hr) |
|---|---|---|---|
| Stirring bath | Nitrogen atmosphere | 130 | 2.0 |
| Prepolymerization reactor A | 100 | 210 | 1.0 |
| Prepolymerization reactor B | 20 | 240 | 0.5 |
| Horizontal, stirred-tank polymerization reactor | 0.30 | 285 | 1.0 |

Under the reaction conditions given above, Application Example 1 was repeated to obtain an aromatic polycarbonate. Under such conditions, stable operation was possible for 2 months. The aromatic polycarbonate formed at the horizontal stirred-tank polymerization reactor outlet had a limiting of viscosity (h) 0.36±0.01.

Particles above 10 μm were not detected in the aromatic polycarbonate formed, and its color was YI=0.9±0.1.

Application Example 4

The polymerization reactors used are shown in FIG. 2, comprising 2 prepolymerization reactors, 1 centrifugal thin-film evaporative polymerization reactor, and 1 horizontal, stirred-tank polymerization reactor. Filters of the absolute accuracy shown below were installed one each at the stirring tank, each prepolymerization reactor, the centrifugal thin-film evaporative polymerization reactor, and horizontal, stirred-tank polymerization reactor outlet.

|  | absolute filtration accuracy |
|---|---|
| Stirring tank outlet | 1 μm |
| Prepolymerizer A outlet | 5 μm |
| Prepolymerizer B outlet | 5 μm |
| Centrifugal shin-film evaporative polymerization reactor | 5 μm |
| Horizontal stiffed polymerizer B outlet | 10 μm |

Reaction conditions are given below.

|  | Pressure (mm Hg) | Temperature (°C.) | Average dwelling time (hr) |
|---|---|---|---|
| Stirring bath | Nitrogen atmosphere | 130 | 2.0 |
| Prepolymerization reactor A | 100 | 210 | 1.0 |
| Prepolymerization reactor B | 20 | 240 | 0.5 |
| Centrifugal shin-film evaporative polymerization reactor | 5 | 275 | 0.1 |
| Horizontal, stirred-tank polymerization reactor | 0.30 | 285 | 0.5 |

Under the reaction conditions given above, Application Example 1 was repeated to obtain an aromatic polycarbonate. Under such conditions, stable operation was possible for 2 months. The aromatic polycarbonate formed at the horizontal stirred-tank polymerization reactor outlet had a limiting viscosity (h) of 0.36±0.01.

Particles above 10 μm were not detected in the aromatic polycarbonate formed, and its color was YI=0.9±0.1.

Comparative Example 1

Application Example 1 was repeated without using filters to obtain an aromatic polycarbonate. The aromatic polycarbonate obtained had color YI=1.2±0.1. The aromatic polycarbonate at the horizontal, stirred-tank polymerization reactor B outlet had a limiting viscosity (h) of 0.36±0.01.

Particles above 10 μm were detected in the aromatic polycarbonate formed.

Comparative Example 2

With installation of a filter of absolute filtration accuracy of 1 mm only at the horizontal stirred-tank polymerization reactor B outlet, Application Example 1 was repeated to obtain an aromatic polycarbonate. The aromatic polycarbonate obtained had color YI=0.9±0.1. The aromatic polycarbonate at the horizontal, stirred-tank polymerization reactor B outlet had limiting viscosity (h) of 0.36±0.01, and particles above 10 μm were not detected. However, 10 days after operation started, the pressure difference of the filter at the horizontal stirred-tank polymerization reactor B outlet rose rapidly, making continued operation difficult.

Comparative Example 3

With no filters installed at all, Application Example 3 was repeated to obtain an aromatic polycarbonate. The aromatic polycarbonate obtained had color YI=1.2±0.1. The aromatic polycarbonate at the horizontal, stirred-tank polymerization reactor B outlet had a limiting viscosity (h) of 0.36±0.01.

Particles above 10μm were detected in the aromatic polycarbonate formed.

Comparative Example 4

With no filters installed at all, Application Example 4 was repeated to obtain an aromatic polycarbonate. The aromatic polycarbonate obtained had color YI=1.2±0.1. The aromatic polycarbonate at the horizontal, stirred-tank polymerization reactor B outlet had a limiting viscosity (h) of 0.36±0.01.

Particles above 10 μm were detected in the aromatic polycarbonate formed.

As shown above, the aromatic polycarbonates obtained by the method of the present invention have excellent color, with low impurity content. The method of the present invention is also excellent in terms of long-term, stable operation.

According to the prepolymerization reactorsent invention, aromatic polycarbonates with excellent color and low impurity content can be obtained in a stable manner for a long period of time.

Figure 1:
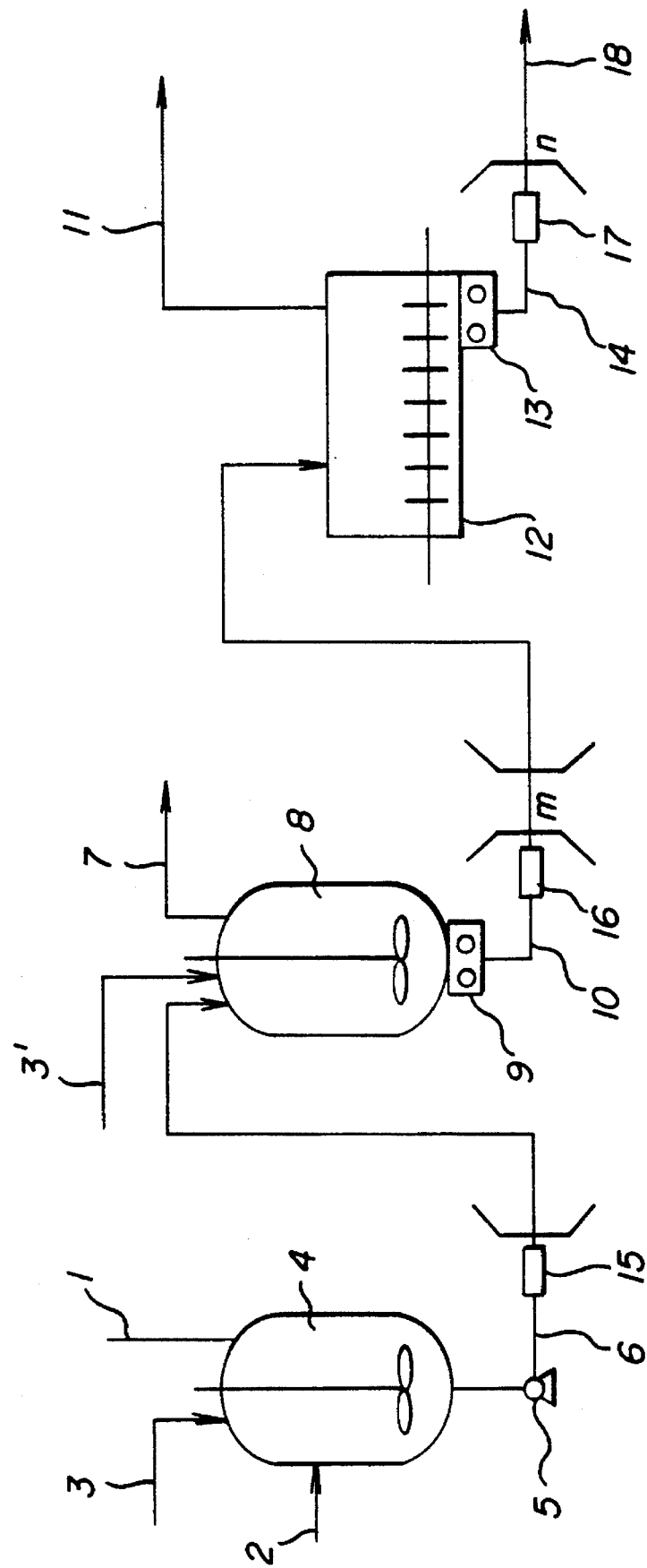
FIG. 1a a flow sheet illustrating an example of the polymerization apparatuses of the method of the present invention (a combination of vertical, stirred-tank polymerization reactor and horizontal, stirred-tank polymerization reactor)
Figure 2:
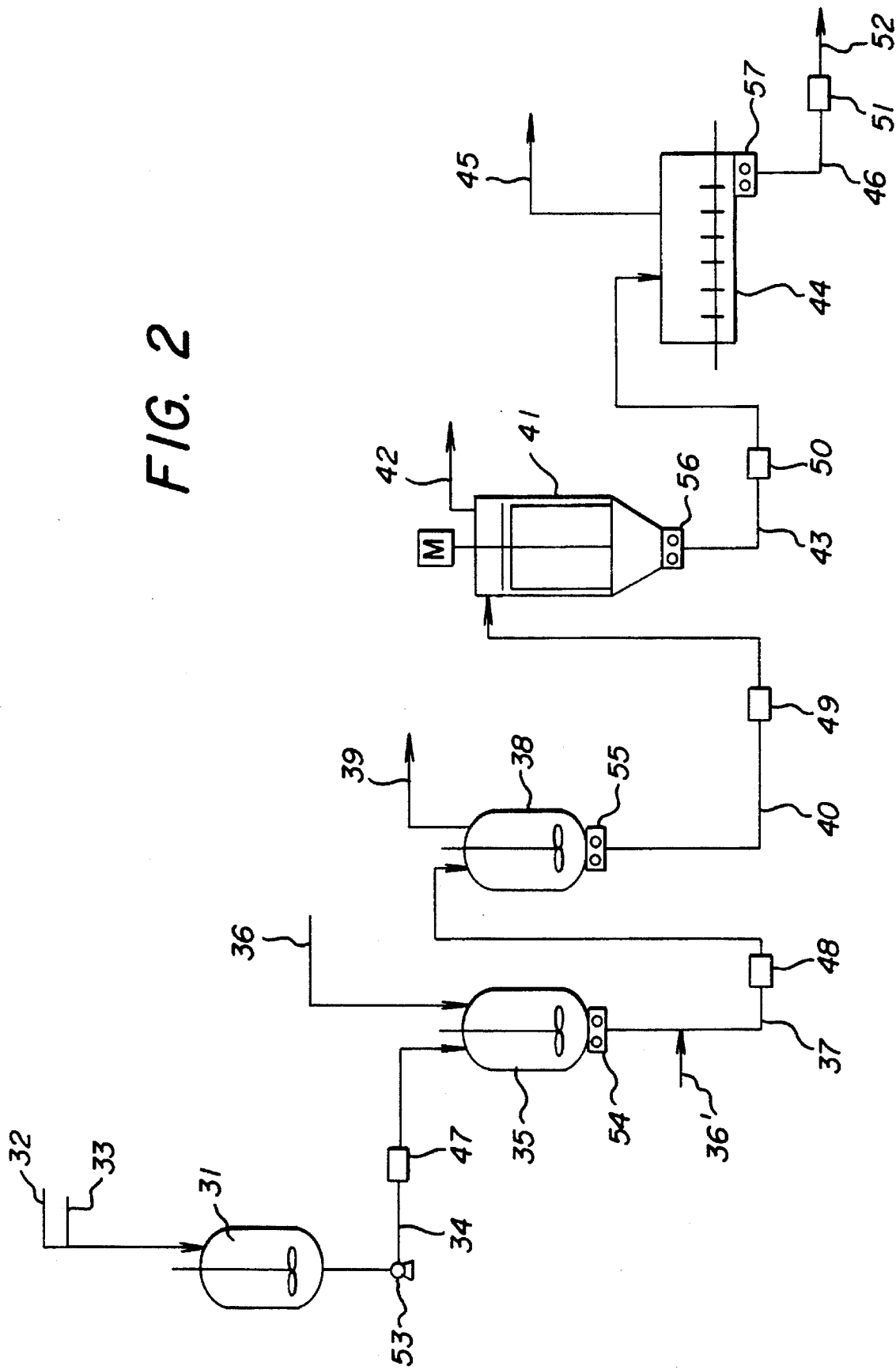
FIG. 2a flow sheet illustrating an example of the polymerization apparatuses of the method of the present invention (a combination of vertical stirred-tank polymerization reactor, centrifugal shin-film evaporative polymerization reactor and horizontal stirred tank polymerization reactor).

Explanation of symbols
1,2,6,10,14 Pipelines
3,3' Catalyst inlet
4 Stirring tank
5,9,13 Pumps
7, 11 Vent pipes
8 Prepolymerization reactor
12 Horizontal, stirred-tank polymerization reactor
15, 16, 17 Filters
18 Product-discharge outlet m³ 1, n³ 1
31 Stirring bath
32,33,34,37, 40, 43, 46 Pipelines
35,38 Prepolymerization reactors
36,36' Catalyst inlets
39, 42, 45 Vent pipes
41 Centrifugal thin-film evaporative polymerization reactor
44 Horizontal, stirred-tank polymerization reactor
47, 48, 49, 60, 51 Filters
52 product-discharge outlet
53, 54, 55, 56, 57 Pumps

We claim:

1. An improved method for manufacturing an aromatic polycarbonate by melt polycondensation of a dihydric aromatic compound and a carbonic acid diester wherein the polycarbonate melt is formed in at least two reactors in series, one of which is a final reactor, wherein the improvement comprises filtering the melt before the final reactor through a filter having an absolute filtration accuracy above 0.5 µm but below 5 µm and filtering the melt at the final reactor outlet through a filter having an absolute filtration accuracy above 5 µm but below 30 µm whereby the polycarbonate is suitable for optical applications or precision parts.

2. Method of claim 1 wherein at least one of the reactors is horizontal.

3. Method of claim 1 wherein at least 3 reactors are used, and at least one reactor is horizontal.

* * * * *